US012615277B1

(12) United States Patent　　　　　　　(10) Patent No.:　　US 12,615,277 B1

Kolavennu et al.　　　　　　　　　　　(45) Date of Patent:　　*Apr. 28, 2026

---

(54) SYSTEM AND METHOD FOR PERFORMING ACCESS CONTROL ENFORCEMENT VIA PACKET INSPECTION

(71) Applicant: U.S. Bank National Association, Minneapolis, MN (US)

(72) Inventors: Soumitri Naga Kolavennu, Plymouth, MN (US); Jayant Chawla, Minneapolis, MN (US); Varshini Sriram, San Jose, CA (US)

(73) Assignee: U.S. Bank National Association, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/316,360

(22) Filed: Sep. 2, 2025

Related U.S. Application Data

(63) Continuation of application No. 19/070,261, filed on Mar. 4, 2025, now Pat. No. 12,432,241.

(60) Provisional application No. 63/711,364, filed on Oct. 24, 2024.

(51) Int. Cl.
　　*H04L 9/40*　　　　　(2022.01)
　　*H04L 41/16*　　　　(2022.01)

(52) U.S. Cl.
　　CPC .......... *H04L 63/1425* (2013.01); *H04L 41/16* (2013.01); *H04L 63/20* (2013.01)

(58) Field of Classification Search
　　None
　　See application file for complete search history.

(56)　　　　　　References Cited

U.S. PATENT DOCUMENTS

| | | | |
|---|---|---|---|
| 8,918,838 B1 | 12/2014 | Baldonado | |
| 9,923,931 B1 * | 3/2018 | Wagster ................. | H04L 43/10 |
| 10,158,657 B1 * | 12/2018 | Bray ..................... | H04L 67/535 |
| 10,200,384 B1 | 2/2019 | Mushtaq | |
| 11,776,276 B1 * | 10/2023 | Muron ................. | G06V 10/764 |
| | | | 382/100 |
| 2012/0240185 A1 | 9/2012 | Kapoor | |
| 2015/0052090 A1 * | 2/2015 | Lin .......................... | G06N 7/01 |
| | | | 706/12 |
| 2015/0067857 A1 * | 3/2015 | Symons ................. | G06N 20/00 |
| | | | 726/23 |
| 2015/0264073 A1 | 9/2015 | Tavakoli | |
| 2018/0189789 A1 | 7/2018 | Caldera | |
| 2019/0164181 A1 * | 5/2019 | Adjaoute .......... | G06Q 20/4016 |
| 2019/0342195 A1 * | 11/2019 | Mermoud ............... | G06N 5/01 |
| 2023/0291890 A1 * | 9/2023 | Pieper ................... | G05D 1/0223 |
| 2024/0203546 A1 * | 6/2024 | Sragow .............. | G06Q 30/0609 |
| 2025/0097236 A1 * | 3/2025 | Tiwari .................. | H04L 63/123 |

(Continued)

*Primary Examiner* — Joseph P Hirl
*Assistant Examiner* — Hassan Saadoun
(74) *Attorney, Agent, or Firm* — Merchant & Gould P.C.

(57)　　　　　　ABSTRACT

Systems and methods are provided for access control enforcement through real-time packet inspection and transaction screening. The system employs one or more processors and memory to execute instructions that analyze packet headers and payloads, enforce access control policies, and utilize machine learning-driven agentic systems to predict associations with sanctioned entities. By comparing packet data against sanction lists and employing hierarchical decision-making processes, the system blocks or flags high-risk packets.

20 Claims, 5 Drawing Sheets

(56) References Cited

U.S. PATENT DOCUMENTS

| | | |
|---|---|---|
| 2025/0260677 A1 | 8/2025 | Yin |
| 2025/0260678 A1 | 8/2025 | Smolsky |

* cited by examiner

SYSTEM AND METHOD FOR PERFORMING ACCESS CONTROL ENFORCEMENT VIA PACKET INSPECTION

CROSS REFERENCE TO RELATED APPLICATIONS

This application claims priority to and is a Continuation of U.S. patent application Ser. No. 19/070,261, filed Mar. 4, 2025, which claims the benefit of U.S. Provisional Patent Application No. 63/711,364, filed Oct. 24, 2024, which are hereby incorporated by reference in their entirety herein.

TECHNICAL FIELD

Example embodiments herein relate generally to the field of network security and compliance monitoring, and more particularly to packet inspection and access control enforcement mechanisms, including the identification and restriction of access to or from entities on sanctions lists.

BACKGROUND

Sanctioned entity screening is a crucial component of compliance and security across various industries, designed to prevent interactions with parties flagged as prohibited or restricted by regulatory authorities. Traditionally, this process has relied heavily on manual review, which introduces inefficiencies and risks, including high rates of false positives and false negatives. These issues arise from complexities like name variations, aliases, foreign language equivalents, and deliberate efforts to obscure identities.

A transfer network is a system or infrastructure that facilitates the transfer of data, funds, or resources between parties. Despite advances in automation, today's network security and compliance monitoring systems on such transfer networks face significant challenges, due, for example, to their reliance on static sanction lists. These lists can quickly become outdated, leading to missed matches or inaccurate results. In dynamic environments, where new entities or individuals may be sanctioned at any time, delays in updating these lists can leave transfer networks and the systems communicating through them vulnerable. Automating the screening of sanctioned entities presents technical hurdles, such as integrating real-time updates, building scalable and efficient compliance systems, and deploying sophisticated matching algorithms that minimize false positives-all without compromising the transfer network's performance.

Additionally, current systems often struggle with contextual analysis. They tend to focus on basic identifier matching (e.g., names or addresses) without considering broader patterns or behaviors that could indicate suspicious activity. This lack of contextual insight leads to an excessive number of false positives, requiring extensive manual intervention, or, conversely, false negatives where sanctioned entities slip through due to slight variations in data.

Another major challenge is scalability. As data traffic grows exponentially due to IoT devices, cloud computing, and other digital services, existing systems struggle to process large volumes of data in real time without sacrificing performance. This bottleneck forces organizations to choose between comprehensive screening and maintaining network speed and efficiency, making it difficult to ensure both robust compliance and operational performance.

Many electronic payment systems today, including Automated Clearing House (ACH), Real-Time Payments (RTP), and wire transfers, are specific types of transfer networks that could benefit from integrating risk-based screening or adaptive learning algorithms. These systems primarily focus on the efficient and fast transfer of funds, but they could enhance security by incorporating complementary network systems that fine-tune scrutiny of high-risk transactions or adapt their detection methods based on emerging threats. This would improve detection in environments with varying levels of threat and compliance risk.

While sanctioned entity screening plays an essential role in network security and compliance, the current systems in place for managing such screening often lack the speed, contextual intelligence, scalability, and adaptability needed to effectively address the complexities of modern cyber and regulatory environments. These shortcomings call for more advanced solutions that can respond to real-time threats, enhance detection accuracy, and improve overall network performance.

SUMMARY

Aspects of the embodiments described herein relate to a system and method for performing access control enforcement via packet inspection, leveraging machine learning-driven agentic systems to enhance security and compliance.

A method for performing access control enforcement via packet inspection includes performing real-time packet inspection on data packets traversing a transfer network, identifying potential security threats based on packet headers and payloads by comparing packet data against predefined sanction datasets, and blocking or flagging packets that match predefined criteria indicating a sanctioned entity. In some embodiments, transaction data is analyzed using cascading rules and agentic systems, dynamically adapting screening processes based on transaction types and regulatory requirements. In an example implementation, the predefined criteria comprise primary thresholds for exact matches against sanction list entries, secondary thresholds for partial matches and contextual indicators, and tertiary thresholds for composite risk scores derived from transaction patterns. In some embodiments, feedback on screening decisions is stored in a training database and used to refine screening models and adjust thresholds dynamically.

In an example implementation, a method for dynamic access control enforcement includes receiving transaction data packets, extracting and normalizing data from the packets, applying fuzzy matching to compare data against sanction lists, and selecting and activating specific agentic systems based on data field types and security risks. In some embodiments, access control recommendations are generated based on the analysis, and explanations are provided to facilitate manual review and decision-making. In an example embodiment, data is extracted by parsing packet headers and payloads to identify entity traits, transaction attributes, and contextual indicators, performing name normalization using machine learning and natural language processing models to standardize entity identifiers, and applying pattern recognition techniques to identify variations in names, addresses, and identification numbers across different formats and languages. In some embodiments, selecting specific agentic systems includes analyzing transaction characteristics and risk profiles by evaluating packet headers and payloads against predefined security protocols, determining transaction types through automated packet classification and routing mechanisms, and deploying enhanced scrutiny models for transactions involving high-risk jurisdictions or elevated sanctions risk.

In some embodiments, a method for improving transaction screening accuracy includes training agentic systems using historical false positive data, dynamically adjusting screening thresholds and predefined criteria based on past outcomes, and providing detailed explanations for screening decisions to aid manual reviewers. In an example implementation, feedback loops are integrated to refine future screening recommendations and reduce false positives over time. In some embodiments, feedback patterns are analyzed across multiple time horizons, key metrics including false positive rates and processing times are tracked, and threshold recalibration procedures are initiated based on sustained performance patterns. In an example embodiment, performance histories for each agentic system are maintained by tracking detection accuracy and false positive rates, selecting future agentic systems based on historical performance metrics and transaction risk profiles, and adapting to emerging transaction behavior patterns while maintaining regulatory compliance through dynamic threshold adjustments. In some embodiments, training agentic systems includes utilizing supervised learning techniques with labeled datasets, incorporating reinforcement learning mechanisms, and periodically retraining using updated datasets.

In an example implementation, a temporal analysis framework is implemented, threshold effectiveness is evaluated across different time periods, and audit trails are maintained for regulatory compliance. In some embodiments, natural language processing models are used for entity name matching, anomaly detection models are utilized for identifying suspicious patterns, and model parameters are adjusted based on advisory system feedback. In an example embodiment, detailed explanations are provided by generating rationales for recommendations based on specific screening criteria and threshold violations, recording reason codes that map to identified risk patterns and compliance rules, and storing the specific criteria and data elements that triggered each screening decision in the training database. In some embodiments, explicit feedback from advisory subsystems and implicit feedback from transaction patterns are analyzed, and screening parameters are automatically updated based on real-time sanction list data feed updates and pattern detection algorithms.

In an example implementation, a hierarchical rules engine is configured to incorporate artificial intelligence models for transaction analysis, execute cascading decision trees to evaluate specific criteria and decision-making steps, and generate evaluation outputs comprising detection accuracy metrics for each decision node, identified patterns in false positive triggers, and recommended threshold adjustments. In some embodiments, the recommended threshold adjustments are automatically applied to refine future screening decisions while maintaining audit trails for regulatory compliance. In an example embodiment, entity traits in transacting parties and watchlist entities are disaggregated, and intelligent matching is performed using multiple analytical tools. In some embodiments, screening thresholds are dynamically adjusted by calculating optimal threshold levels using statistical analysis of historical transaction outcomes, automatically tuning detection parameters based on false positive rates and processing efficiency metrics, and implementing predictive models to adjust threshold values according to emerging risk patterns and transaction volumes.

In some embodiments, systems and methods for performing access control enforcement via packet inspection are disclosed. An example implementation includes one or more processors executing instructions stored in memory to perform real-time packet inspection, enforce access control policies based on packet headers and payloads, and compare packet data against sanction list data feeds. In some embodiments, packets that match predefined criteria may be blocked or flagged for further analysis.

In an example implementation, the system utilizes agentic systems trained with machine learning models to predict whether a packet may be associated with a sanctioned entity. In some embodiments, these agentic systems are trained using supervised learning, reinforcement learning, and historical transaction data to improve accuracy over time.

In some embodiments, a method for access control enforcement includes performing packet inspection on data traversing a network, identifying security threats by comparing packet data against predefined sanction datasets, and blocking or flagging packets matching criteria indicative of a sanctioned entity. An example implementation further analyzes transaction data using cascading rules and agentic systems, dynamically adapting screening processes based on transaction types and regulatory requirements.

In some embodiments, a non-transitory computer-readable medium stores instructions that, when executed, enable real-time packet inspection and enforcement of access control policies. In an example implementation, these instructions also allow for the identification of high-risk transactions using machine learning-based agentic systems.

An example implementation for enhancing transaction security includes a transaction server facilitating transactions between user devices and third-party entities, a screening server for real-time packet monitoring, and sanction list data feeds providing compliance updates. In some embodiments, the screening server includes agentic system trainers and a memory storing cascading rules and machine learning models for adaptive screening.

In some embodiments, agentic systems utilize natural language processing and large language models to analyze transaction records and provide contextual understanding. In an example implementation, a dynamic access control method involves receiving transaction data packets, normalizing extracted data, and applying fuzzy matching to compare against sanction lists. Specific agentic systems may be selected and activated based on data field types and security risks.

In some embodiments, systems and methods reduce false positives in transaction screening by employing hierarchical agentic system analysis, disaggregating transaction data, and applying machine learning and natural language processing techniques. In an example implementation, a hierarchical decision tree evaluates entity traits and transaction attributes to improve screening accuracy.

An example implementation of a method for improving transaction screening accuracy involves training agentic systems using historical false positive data, dynamically adjusting screening thresholds, and providing detailed explanations for screening decisions to aid manual reviewers. In some embodiments, feedback loops are integrated to refine screening recommendations and reduce false positives over time.

In some embodiments, access control enforcement systems are designed to dynamically adjust screening thresholds based on past outcomes and provide reviewers with explanatory details for decision-making. An example implementation further incorporates feedback mechanisms to continuously improve future screening accuracy.

DETAILED DESCRIPTION

Figure 1:
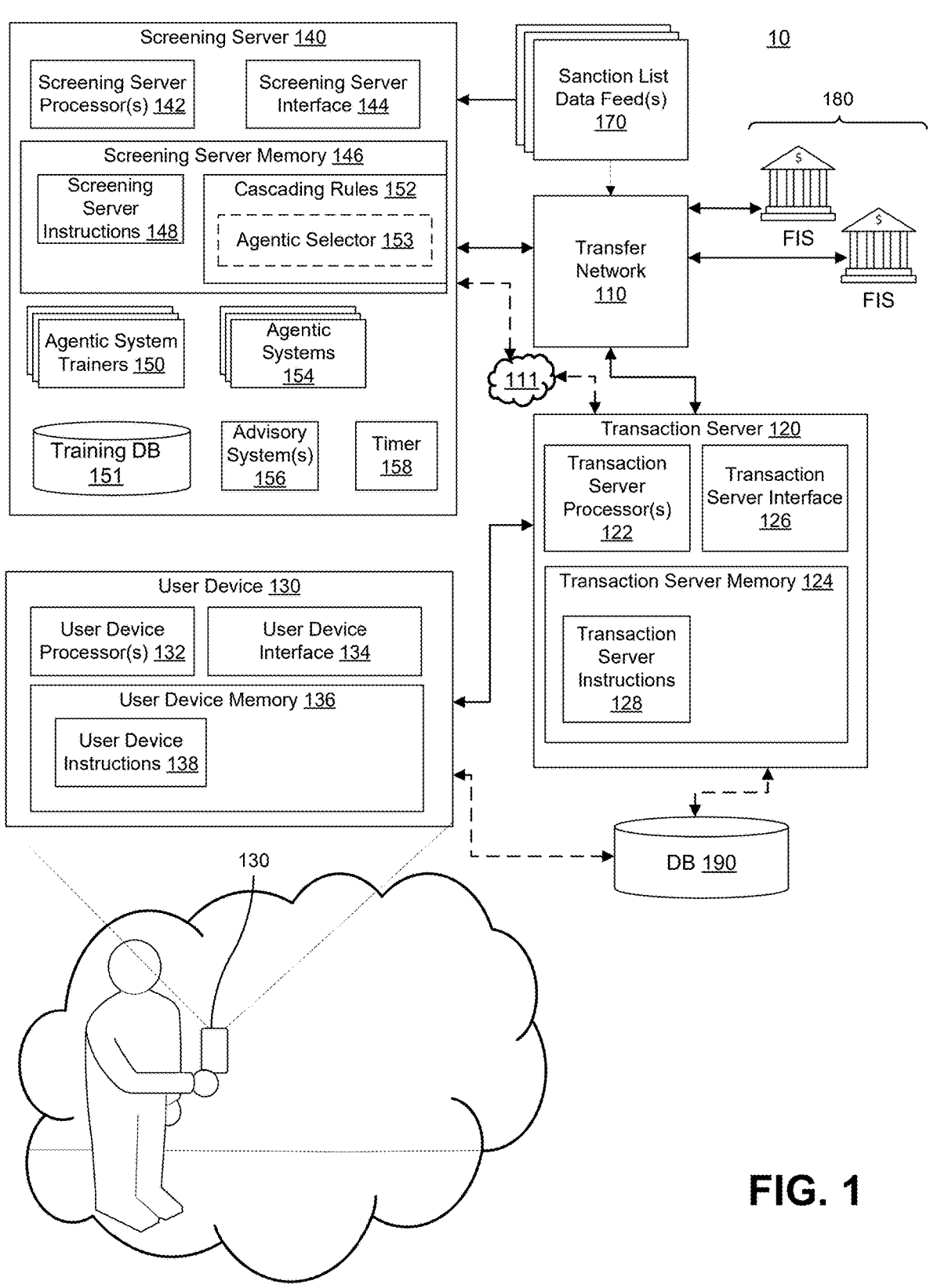
FIG. 1 illustrates a transaction security framework that performs access control enforcement via packet inspection according to an example embodiment.

FIG. 1 illustrates a transaction security framework 10 that performs access control enforcement via packet inspection according to an example embodiment. Generally, through a packet inspection process, the transaction security framework 10 evaluates data packets in real time to enforce access control policies. This involves scrutinizing packet headers and payloads to assess compliance with security protocols, identify potential threats, and ensure that transactions adhere to regulatory requirements based on information from the sanction list data feeds 170. In the context of sanctioned entity screening, a false positive occurs when a transaction, individual, or entity is flagged as being associated with a sanctioned party, but upon further review, it turns out to be a mistake. This happens when the screening system incorrectly identifies a match with a name or identifier on a sanctions list, even though the flagged party is not actually sanctioned. False positives can arise due to common names, data entry errors, or vague matching criteria, leading to unnecessary delays in processing legitimate transactions or requiring additional manual reviews to confirm the match's accuracy. Reducing false positives is important for maintaining efficient compliance processes without sacrificing security but technically challenging.

In some embodiments, predefined criteria for blocking or flagging packets includes a multi-tiered threshold system. Primary thresholds evaluate exact matches against sanction list entries, including entity names, addresses, and identification numbers. Secondary thresholds assess partial matches and contextual indicators, such as geographic locations associated with sanctioned regions, transaction patterns characteristic of sanctioned entities, and linguistic variations of sanctioned entity names. Tertiary thresholds examine composite risk scores derived from multiple data points, including transaction frequency, amount patterns, and network behavior analytics. The system may automatically block packets that exceed primary thresholds, while packets exceeding secondary or tertiary thresholds may be flagged for further review by advisory systems.

By leveraging the packet inspection technology described herein, the transaction security framework 10 enhances the security and integrity of transactions conducted over the transfer network and reduces the number of false positives that would otherwise delay a transaction but also slow down or otherwise disrupt the flow of communications across the transfer network 110.

The transaction security framework 10 includes a transaction server 120, a user device 130, a screening server 140, one or more sanction list data feeds 170. In this framework, data packets exchanged between the transaction server 120, user device 130, and screening server 140 traverse a transfer network 110. The transfer network 110 is a system that facilitates the transfer of data, funds, or resources from one point to another. Examples of transfer networks include electronic payment systems such as the Automated Clearing House (ACH), Real-Time Payments (RTP), and wire transfers. Transfer network 110 can also include local area networks, wide area networks, intranets, or the Internet. In some embodiments, screening server 140 and transaction server 120 communicate directly through an alternative network 111.

The transfer network 110, in some embodiments, also interfaces with financial institution systems 180 to facilitate the transfer of funds or information (e.g., documents) between parties engaged in a transaction, such as between the user of user device 130 and a third party (not shown). A financial institution systems 180 refers to the software and hardware infrastructures utilized by banks and financial institutions to manage, process, and secure transactions. It should be understood that the specific details of the underlying transaction are not the focus of the embodiments described here. Instead, when incorporated into the transaction security framework 10, the additional security measures improve the overall protection of these transactions and ensure compliance with sanctions screening requirements in a more efficient manner.

Screening server 140 is a server device that performs one or more processes described herein. Generally, screening server 140 operates as a real-time packet monitoring component for automated packet traffic screening that can operated independently or be integrated into one or more components coupled to the transfer network 110. For example, in some embodiments, the screening server 140 can be incorporated into the transfer network 110. In some embodiments, the screening server 140 can be incorporated into the transaction server 120. In some embodiments, aspects of the screening server 140 are incorporated into the user device 130. In yet other embodiments, aspects of the screening server 140 are distributed across the components coupled via the transfer network 110. For example, trained models can be applied to the applications run on the user device 130 and the transaction server 120 to distribute the processing of the real-time packet monitoring descried herein.

In an example implementation, screening server 140 operates to continuously monitor packet data and compare the packet data against pre-defined sanction datasets obtained from the one or more sanction list data feeds 170. If a match is found, the screening server 140 can either block the packet entirely to prevent further transmission or flag it for additional review. Flagged packets are delayed pending further inspection by advisory subsystems 156, which can be automated systems or compliance officers, to confirm if they pertain to a sanctioned entity. In some embodiments, advisory subsystems 156 are arbitrators who can, via a computer interface, enter a final arbitration decision to mark a transaction as pass, fail, paused for further inspection, and the like.

The term "expert system" generally refers to a software system designed to mimic human expertise by using predefined rules, often based on an "if-then-else" logic, to analyze and solve specific problems. Traditional expert systems rely heavily on these rules and are limited to the scope of the predefined logic, halting once the analysis is complete. Aspects of the embodiments described herein go beyond the functionality of these conventional expert systems. The screening server 140 described herein moves beyond static rule-based frameworks. Rather screening server 140 incorporates a plurality of agentic systems 154.

An agentic system builds upon the foundation of expert systems but introduces a significant technical advancement. While traditional expert systems rely on static, predefined rules (e.g., "if-then-else" logic), agentic systems incorporate a large language model (LLM) to dynamically manage multiple components of expertise, enabling flexible, adaptive, and sophisticated problem-solving. However, the system's capabilities extend beyond the use of LLMs alone.

In addition to LLMs, agentic systems can integrate various other technologies. They may incorporate traditional rule-based frameworks for deterministic processes, alongside machine learning (ML) models for pattern recognition, classification, or prediction tasks. Reinforcement learning allows the system to improve its responses over time by learning from interactions with its environment. In some cases, multi-agent systems are used, with different autonomous agents specializing in specific tasks and coordinating their efforts.

In some embodiments, the feedback processing system incorporates both explicit feedback from advisory subsystems 156 and implicit feedback derived from transaction patterns and outcomes. The agentic systems 154 utilize this feedback data to adapt their screening criteria through reinforcement learning mechanisms. Each agentic system maintains a performance history that influences its selection by the agentic system selector 153 for future transactions. The system's adaptive learning capabilities enable it to recognize and adjust to emerging patterns in transaction behavior while maintaining compliance with regulatory requirements based on data from sanction list data feeds 170.

Moreover, agentic systems often integrate real-time data and contextual awareness to dynamically adapt to changing conditions. They can also utilize specialized natural language processing (NLP) models for tasks like sentiment analysis or entity recognition, further enhancing their interaction with unstructured data and human users.

In some embodiments, the machine learning models employed by the agentic systems include specialized neural networks trained on historical transaction data, natural language processing models optimized for entity name matching, and anomaly detection models for identifying suspicious transaction patterns. These models are trained using supervised learning techniques with labeled datasets containing known sanctioned entity transactions, confirmed false positives, and legitimate transaction examples. The training process incorporates reinforcement learning mechanisms that adjust model parameters based on feedback from advisory system reviews. Performance metrics for these models include false positive rates, detection accuracy, and processing latency, with specific thresholds established for each metric to ensure optimal system performance. The models undergo periodic retraining using updated datasets from the training database to maintain accuracy and adapt to emerging patterns.

In some embodiments, screening server 140 includes one or more agentic system trainers 150 that operate to train the agentic systems 154 to enhance their performance and adaptability. These agentic system trainers 150 utilize various methodologies, including supervised learning and reinforcement learning, to fine-tune the systems' responses based on diverse datasets. In certain cases, agentic system trainers 150 leverage a training database 151 to provide a repository of information, allowing the systems to learn from past interactions and improve their decision-making capabilities.

In some embodiments, the system implements a multi-layered feedback collection and processing architecture to continuously refine screening thresholds. Advisory systems 156 provide structured feedback on screening decisions through a standardized interface, capturing both binary outcomes (true/false positive) and detailed contextual information about why a particular screening decision was correct or incorrect. This feedback is stored in the training database 151 and used by agentic system trainers 150 to refine the screening models and adjust thresholds dynamically.

In some embodiments, screening server memory 146 stores cascading rules 152 which together with agentic systems 154 collectively enable the screening server 140 to provide a hierarchical agentic system that analyzes transaction data using a combination of rule-based analysis and advanced artificial intelligence (AI) techniques, including machine learning (ML) models, natural language processing (NLP), and large language models (LLMs).

In some embodiments, the cascading rules 152 include instructions which, when executed by the one or more screening server processors 142, causes the one or more screening server processors 142 to operate as an agentic system selector 153. Agentic system selector 153 is a component within a broader agentic system that dynamically chooses or activates different agents or processes to solve a specific problem or handle a task. Agents can be independent modules or subcomponents that perform tasks like decision-making, problem-solving, or data analysis based on predefined rules or artificial intelligence models such as large language models (LLMs).

In some embodiments, the agentic system selector employs a dynamic model selection framework that chooses specific machine learning models based on transaction characteristics and risk profiles. For high-value transactions or those involving jurisdictions with elevated sanctions risk, the system may deploy more sophisticated models with enhanced scrutiny capabilities. The selection process considers factors such as transaction type (e.g., ACH, wire transfer, or real-time payments), geographic risk factors, and historical false positive rates for similar transactions. This adaptive approach ensures appropriate resource allocation while maintaining screening effectiveness.

The agentic selector 153 acts as a control mechanism that determines which agent(s) to use depending on the situation or input. For example, the agentic system selector might analyze incoming data, assess the problem context, and then choose the appropriate agent—such as one focused on natural language processing, machine learning, or rule-based decision-making—to handle the task at hand.

In some embodiments, screening server 140 includes a timer 158 to keep track of how long a packet has been flagged for inspection. Timer 158 is initiated to provide notifications of deadlines by which the inspection needs to take place. If the inspection is not cleared by a predetermined timeframe, in some embodiments, a notification can be automatically communicated to the transaction server 120. In some embodiments, if the inspection is not cleared by a predetermined timeframe, a notification is automatically communicated to the user device 130 that initiated or otherwise was involved in the underlying transaction. The notification can include a message that the transaction has been delayed, canceled, or flagged for further action.

In the illustrated example, the screening server 140 includes one or more screening server processors 142, one or more screening server interfaces 144, and screening server memory 146, among other components.

In an example embodiment, the screening server 140 employs an iterative threshold adjustment process that analyzes feedback patterns across multiple time horizons. Short-term adjustments occur based on immediate feedback from advisory systems 156, while longer-term threshold modifications are derived from aggregate performance analysis. The system tracks key metrics including false positive rates, processing times monitored by timer 158, and detection accuracy across different transaction types. When performance metrics indicate a sustained pattern of false positives in specific scenarios, the agentic system trainers 150 automatically initiate threshold recalibration procedures.

The one or more screening server processors 142 are one or more components of the screening server 140 that execute instructions, such as instructions that obtain data, process the data, and provide output based on the processing. The one or more screening server processors 142 can include one or more aspects described below in relation to the one or more processors 512 of FIG. 5.

The one or more screening server interfaces 144 are one or more components of the screening server 140 that facilitate receiving input from and providing output to a component external to the screening server 140. The one or more screening server interfaces 144 can include one or more aspects described below in relation to the one or more interfaces 518 of FIG. 5.

The screening server memory 146 is a collection of one or more components of the screening server 140 configured to store instructions and data for later retrieval and use. The screening server memory 146 can include one or more aspects described below in relation to the memory 514 of FIG. 5. The screening server memory 146 can store screening server instructions 148. The screening server instructions 148 are instructions that, when executed by the one or more screening server processors 142, cause the one or more screening server processors 142 to perform one or more operations described herein (e.g., to execute the cascading rules 152).

The user device 130 is a device used by a user that can be used as part of processes described herein. The user device 130 can include one or more aspects described elsewhere herein such as in reference to the computing environment 500 of FIG. 5. In many examples, the user device 130 is a personal computing device, such as a smart phone, tablet, laptop computer, or desktop computer. But the user device 130 need not be so limited and may instead encompass other devices used by a user as part of processes described herein. In the illustrated example, the user device 130 can include one or more user device processors 132, one or more user device interfaces 134, and user device memory 136, among other components.

The one or more user device processors 132 are one or more components of the user device 130 that execute instructions, such as instructions that obtain data, process the data, and provide output based on the processing. The one or more user device processors 132 can include one or more aspects described below in relation to the one or more processors 512 of FIG. 5.

The one or more user device interfaces 134 are one or more components of the user device 130 that facilitate receiving input from and providing output to a component external to the user device 130. The one or more user device interfaces 134 can include one or more aspects described below in relation to the one or more interfaces 518 of FIG. 5.

The user device memory 136 is a collection of one or more components of the user device 130 configured to store instructions and data for later retrieval and use. The user device memory 136 can include one or more aspects described below in relation to the memory 514 of FIG. 5. As illustrated, the user device memory 136 stores user device instructions 138.

The user device instructions 138 are a set of instructions that, when executed by one or more of the one or more user device processors 132, cause the one or more user device processors 132 to perform an operation described herein. In examples, the user device instructions 138 can be those of a mobile application (e.g., that may be obtained from a mobile application store, such as the APPLE APP STORE or the GOOGLE PLAY STORE). The mobile application can provide a user interface for receiving user input from a user and acting in response thereto. The user interface can further provide output to the user. In some examples, the user device instructions 138 are instructions that cause a web browser of the user device 130 to render a web page associated with a process described herein. The web page may present information to the user and be configured to receive input from the user and take actions in response thereto.

Additionally, the user device 130 can be used to initiate a transaction by communicating with the transaction server 120, enabling the transaction server to begin executing the transaction. The user device can also receive messages from the transaction server or screening server 140, indicating whether a transaction has been processed, paused, or stopped due to the screening processes described herein. In some examples, these instructions may be web browser-based, rendering a web page that interacts with the processes described herein, allowing the user to take action and receive real-time updates.

The transaction server 120 facilitates transactions between a user device 130 and third-party entities (not shown), such as other users or businesses, across the transfer network 110. In the illustrated example, the transaction server 120 includes one or more transaction server processors 122, transaction server memory 124, and one or more transaction server interfaces 126. In some embodiments, the transaction server 120 communicates securely with the transfer network 110, which in turn transmits instructions to the financial institution systems 180. The transfer network 110 (e.g., RTP, ACH, wire, etc.), using its own specific protocols, causes the financial institutions systems 180 to transfer funds as part of the transaction.

The one or more transaction server processors 122 are one or more components of the transaction server 120 that execute instructions, such as instructions that obtain data, process the data, and provide output based on the processing. The one or more transaction server processors 122 can include one or more aspects described below in relation to the one or more processors 512 of FIG. 5.

The transaction server memory 124 is a collection of one or more components of the transaction server 120 configured to store instructions and data for later retrieval and use. The transaction server memory 124 can include one or more aspects described below in relation to the memory 514 of FIG. 5. The transaction server memory 124 can store transaction server instructions 128.

The transaction server instructions 128 are instructions that, when executed by the one or more transaction server processors 122, cause the one or more transaction server processors 122 to perform one or more operations described elsewhere herein.

The one or more transaction server interfaces 126 are one or more components of the transaction server 120 that facilitate receiving input from and providing output to a component external to the transaction server 120. The one or more user transaction server interfaces 126 can include one or more aspects described below in relation to the one or more interfaces 518 of FIG. 5.

In some embodiments, one or more databases 190 containing pre-stored data to complete the transaction are communicatively coupled to the user device 130. In some embodiments, one or more databases 190 containing pre-stored data required to complete the transaction are communicatively coupled to the transaction server 120. This data may be inserted into packets containing transaction records to provide information to screening server 140 to enable screening server 140 to perform the screening described herein.

Figure 2:
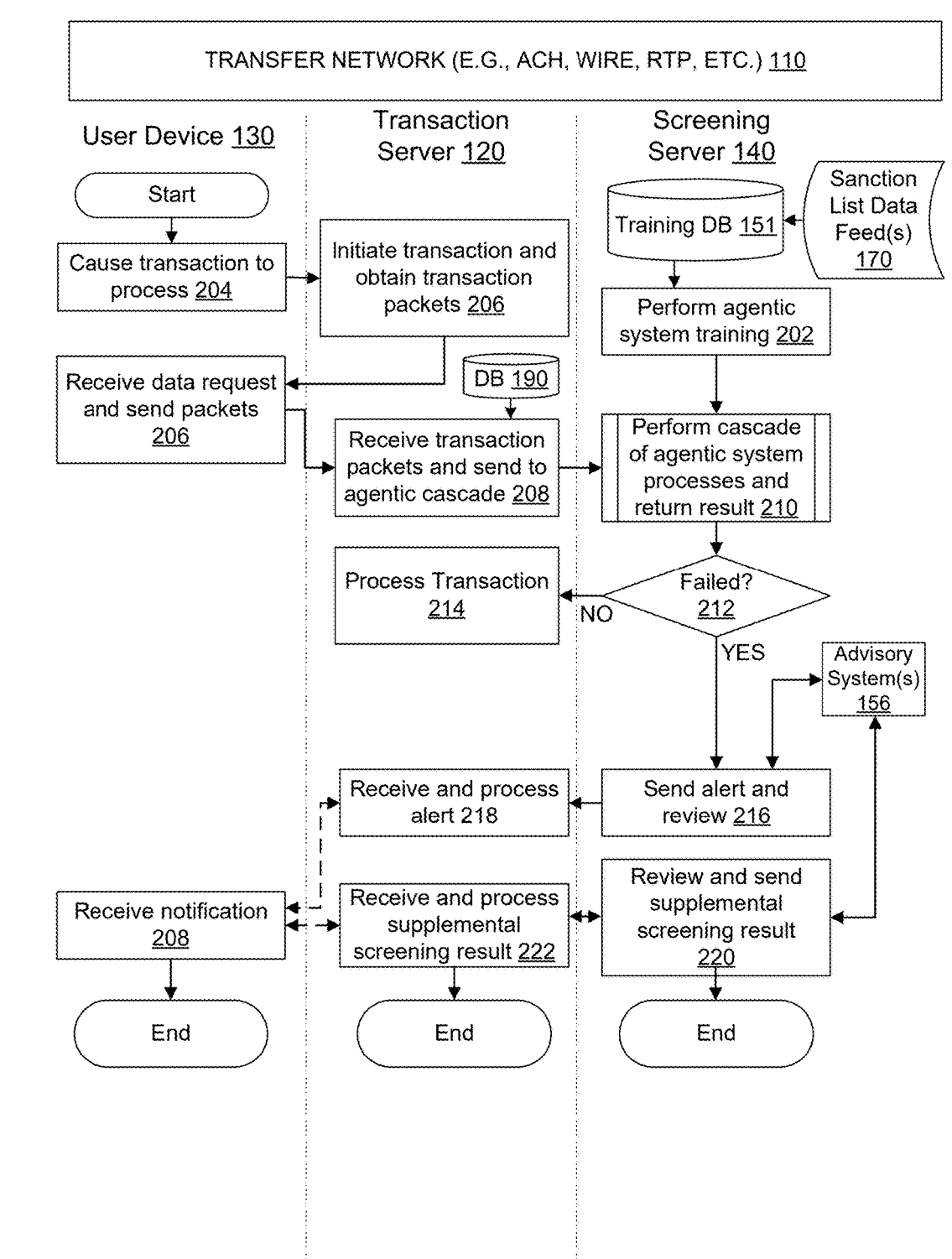
FIG. 2 illustrates an example access control enforcement process according to an example embodiment.

FIG. 2 illustrates an example access control enforcement process 200 according to an embodiment. In this process, packet inspection is conducted in real-time, where packets are evaluated to enforce access control policies. This evaluation involves analyzing both packet headers and payloads to assess their compliance with security protocols, detect potential threats, and ensure that access requests conform to regulatory requirements using data from the sanction list data feeds 170. By implementing this process, the system enhances the security and integrity of communications across the transfer network 110 while reducing the likelihood of false positives that could otherwise cause delays or disrupt the flow of information.

Referring still to FIG. 2, agentic system training operation 202 is responsible for training one or more agentic systems 154. The agentic system trainers 150 use various methodologies such as supervised learning and reinforcement learning to fine-tune the agentic systems' responses and decision-making capabilities. In some cases, the agentic system training operation 202 utilizes training database 151, which provides a rich dataset, allowing the system to learn from past interactions and continuously improve its performance. This training database may also include sanction list data obtained from one or more sanction list data feeds 170, allowing the agentic systems to improve their ability to recognize and flag high-risk transactions.

Once the agentic systems are trained, screening server 140 uses them to perform risk-based screening mechanisms, assessing incoming packets based on screening factors such as origin, destination, and the type of communication. Packets deemed to be of higher risk undergo additional scrutiny, ensuring that potentially harmful or non-compliant data is blocked or delayed. When a high-confidence match is detected (e.g., a packet corresponding to a sanctioned entity), the system can escalate the incident, generate detailed reports, and notify regulatory bodies, ensuring real-time compliance with legal and regulatory standards. This automated approach improves both efficiency and accuracy in sanction screening and access control.

The process begins, in some embodiments, when a user device 130 submits a transaction request, as shown by operation 204, for example, by communicating a transaction message to transaction server 120. The transaction server processes this request by obtaining transaction packets, which may involve requesting specific information from user device 130, as indicated by operation 206. The user device then responds by sending data packets containing the requested information, which are subsequently received by the transaction server 120 and forwarded to screening server 140 for inspection, as shown by operation 208.

If only a portion of the requested data is received, if available, transaction server 120 may retrieve additional data from the one or more databases 190. For instance, the user device 130 may send tokens to the transaction server 120, which are then used to access additional information related to an account or entity involved in the transaction. In some embodiments, the user device 130 is prompted to return additional missing information.

Operation 210 involves a cascading rules process, where a cascading decision tree is used to analyze the transaction data. At each node of the decision tree, the cascading rules 152 invoke one or more agentic systems 154 to evaluate the data and apply the corresponding rule. This process disentangles key entity traits, such as names, addresses, social security numbers, and dates of birth, from the transaction data, allowing the system to intelligently match or flag them based on learned patterns and regulatory watchlists. This analysis may also involve natural language processing (NLP) or utilize an application processing interface (API) tool to perform more advanced screening operations.

During operation 210, the system uses cascading rules 152 and agentic systems to break down transaction data into individual traits, applying a mixture of agentic components (including large language models, or LLMs) to assess each trait. The system matches or flags the data based on intelligent comparisons with regulatory watchlists, while simultaneously reducing false positives. Additionally, the system adapts to various transaction types—including ACH, wire transfers, international transactions, and real-time payments—by recognizing the format of each transaction and applying the appropriate rules for that specific type.

If, at test operation 212, it is determined that the data has passed the screening, a message indicating successful inspection is sent to the transaction server 120, which then proceeds with processing the transaction as shown by operation 214.

Conversely, if the screening fails, the screening server 140 performs an alert operation 216, notifying the transaction server 120 that the transaction failed to pass inspection. Additionally, the screening server 140 may forward the transaction data to one or more advisory systems 156 for further review.

In some embodiments, an alert message is communicated to the transaction server 120, explaining that the transaction has been flagged as involving a sanctioned entity and providing the specific reasons for the failure. The advisory systems 156 may then review the flagged transaction data and make a final determination regarding whether the transaction should be approved, stopped, or paused (e.g., pending further review or as a result of a request for additional information). The supplemental screening results are communicated back to the transaction server 120 as shown by operation 220.

Upon receiving the alert, the transaction server 120 may take various actions, such as pausing the transaction pending a further review by the advisory systems 156 or halting the transaction altogether. In some cases, the alert may request additional information, prompting operation 218 to gather and submit the necessary data to attempt to pass the transaction.

Similarly, in operation 222, the transaction server may take actions based on the alert, which could include pausing, stopping, or proceeding with the transaction, depending on the outcome of the supplemental review. The alert may also request additional information, which the transaction system 120 can retrieve (e.g., from database 190 or via a request to the user device 130) in an attempt to resolve any issues and pass the transaction.

Figure 3:
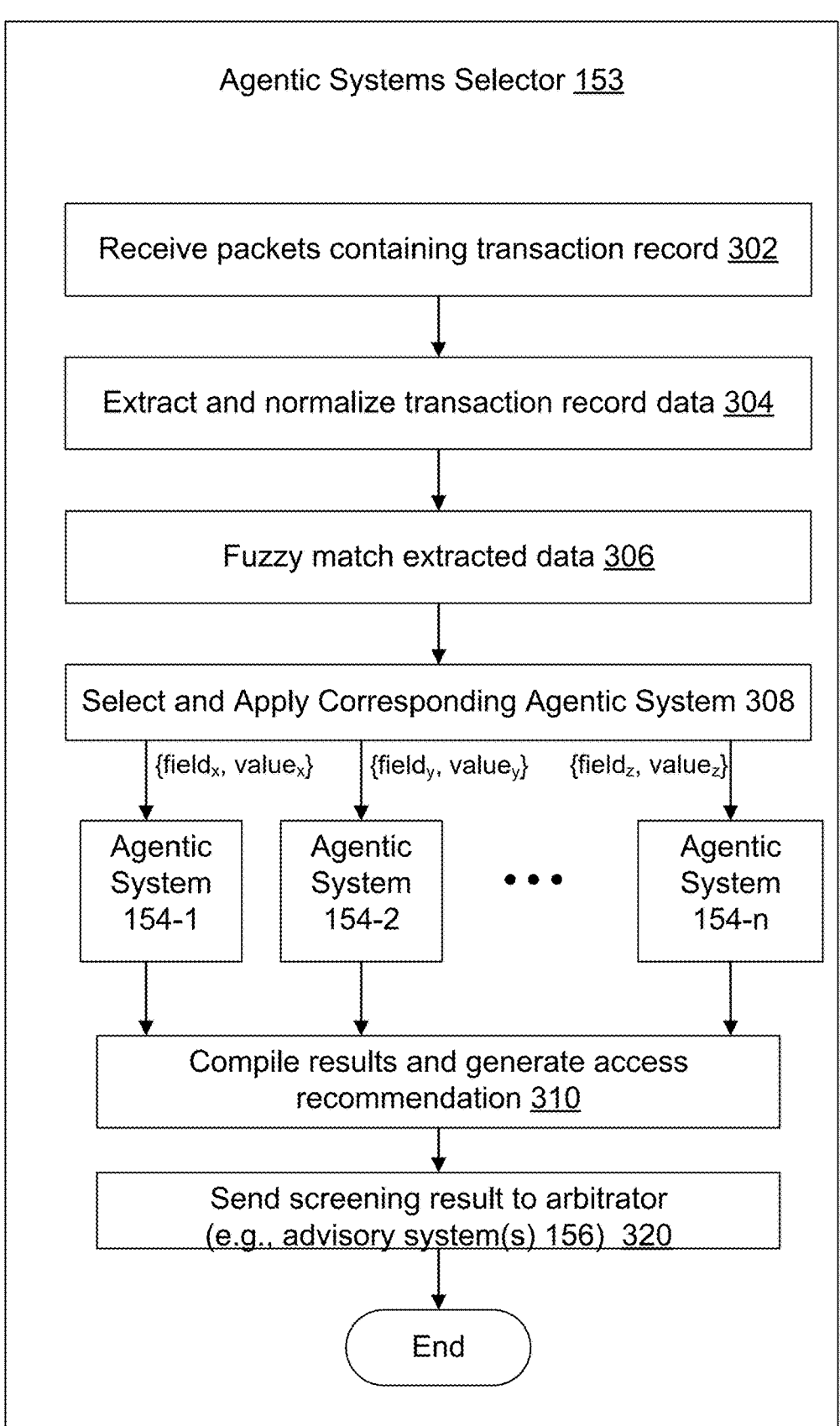
FIG. 3 illustrates the agentic system selection and transaction analysis process according to an example embodiment.

FIG. 3 illustrates an agentic system selection and transaction analysis process 300 according to an example embodiment.

In some embodiments, as illustrated in FIG. 1 and FIG. 3, the cascading rules 152 enable the screening server processors 142 to function as an agentic system selector 153, guiding the evaluation of transaction data and the generation of access control recommendations. The process begins with the receive operation 302, where the system receives packets containing transaction records. These records are then processed through an extract and normalize operation 304 to ensure the data is in a consistent format for further analysis. Following this, a fuzzy matching operation 306 is applied, allowing the system to extract and compare key elements of the transaction record against predefined data sets, accommodating imperfect or incomplete information.

Next, an agentic system selection operation 308 determines which specific agentic system (e.g., agentic system 154-1, agentic system 154-2, etc.) should handle particular {field, value} pairs within the transaction data. In FIG. 3, the variables with indexes x, y, z, and n represent integer values used as indexing parameters. The selection is based on predefined criteria such as the nature of the data fields (e.g., personal identifiers, transaction amounts), security risks associated with the values, and relevant regulatory or compliance considerations. Once the appropriate agentic system is selected, it processes the data through a processing and recommendation operation 310. This operation leverages the agentic system's specialized capabilities—such as rule-based analysis, machine learning models, or natural language processing—to evaluate the data and generate an access recommendation or flag for further review.

Finally, a final disposition operation 320 sends the screening results and access recommendation to an arbitrator system, such as the advisory system 156, for review. The arbitrator evaluates the recommendation and makes a final determination, which may involve confirming, modifying, or rejecting the recommendation based on further compliance checks or specific security protocols. This series of operations ensures a robust and flexible access control enforcement process, leveraging cascading rules and dynamic agentic system selection to optimize decision-making and enhance security.

Referring also to FIG. 1, in some embodiments, aspects of the invention enable the screening server 140 to revisit transactions that were manually rejected but later determined to have been wrongly rejected as false positives based on subsequent manual review of the packet data. This enables the screening server 140 to learn from past decisions and refine its future recommendations. When a false positive is identified, the screening server 140 can process the transaction data through a specialized agentic system 154 to obtain an explanation for the error and understand why the system initially flagged the transaction incorrectly.

In some embodiments, the system implements a temporal analysis framework that evaluates threshold effectiveness across different time periods and transaction volumes. Historical performance data stored in the training database 151 is analyzed to identify patterns in false positives and detection accuracy. This analysis informs automated threshold adjustments while maintaining audit trails for regulatory compliance. The threshold evolution process is designed to balance the need for accurate detection with operational efficiency, using statistical analysis of past outcomes to predict optimal threshold levels for different transaction scenarios.

This specialized agentic system 154, sometimes described as a hierarchical rules engine incorporating AI, operates by examining the specific criteria and decision-making steps that led to the false positive. The cascading rules 152 (also referred to as a hierarchical rules engine") functions like a cascading decision tree, where each node represents a set of predefined rules or thresholds based on which a decision is made. For example, the hierarchical rules engine may evaluate various transaction attributes such as the origin, destination, financial amounts, or associated entities (e.g., names, addresses) and compare them against watchlists or compliance rules.

The AI component of the agentic systems 154 enhances this process by dynamically adjusting thresholds or weighing certain attributes differently based on past outcomes, such as historical data on false positives. The AI may incorporate machine learning techniques to refine its decision-making process and offer explanations for why the system flagged a transaction for review, helping to reduce future occurrences of false positives.

By providing detailed explanations for these recommendations, the screening server 140 aids manual reviewers in understanding both the rationale behind the initial rejection and the factors that led to it being adjudicated as a false positive. Over time, this feedback loop helps improve the screening server's accuracy and ensures that legitimate transactions are not wrongly interrupted while maintaining robust security and compliance checks.

For each part of the decision tree, either a machine learning model, language model, NLP model, or API tool, or a combination thereof comes up with the with the answer for the rule developed for that part of the decision tree. Accordingly, a cascading mixture of agentic systems is provided, where each of these agentic processes a certain aspect of the data contained in network packets, and each agentic system disaggregates or matches the data intelligently and using multiple tools.

In some embodiments, a system and method for cascade decision-making in an agentic framework are provided. The system utilizes a hierarchical arrangement of autonomous agents that process decisions sequentially, breaking down complex decision-making processes into smaller, manageable stages. Each agent in the system is responsible for a specific decision tier, and the output of one agent is passed to the next, forming a cascading flow of decisions.

In some embodiments, the system incorporates a choice cascading model wherein broad decisions are processed by initial agents, and subsequent agents handle more specific decisions. This tiered approach ensures that each decision aligns with predetermined priorities or predefined criteria. The agents progressively narrow the scope of options, refining the decision at each stage to optimize alignment with the system's goals.

In some embodiments, for each part of the decision tree, a machine learning model, language model, natural language processing (NLP) model, or application programming interface (API) tool, or a combination thereof, generates answers based on the rules developed for that part of the decision tree. This integration allows for a cascading mixture of agentic systems, where each agentic system intelligently processes a certain aspect of the data contained in network packets. Each agentic system is designed to disaggregate or match the data effectively using multiple analytical tools, enabling a nuanced understanding of the inputs at each stage of the decision-making process.

In some embodiments, the system also simulates information cascades, a phenomenon in which agents base their decisions not only on individual data inputs but also on the choices of preceding agents in the cascade. This feature enables the system to emulate network-based decision-making behaviors, where earlier decisions influence subsequent ones, ensuring consistency and coherence across the decision flow. Agents may prioritize decisions that have already gained support in prior stages.

In embodiments involving collaborative decision-making among multiple agents, the system may experience cascades wherein decisions from early-stage agents influence later-stage agents disproportionately. This could occur when agents, interpreting prior decisions as correct or authoritative, propagate those choices through the system without recalibrating based on new or conflicting data. The system includes mechanisms to detect and mitigate these cascades, ensuring the introduction of alternative decision paths or recalibration checks as necessary.

The system thus provides a robust framework for sequential decision-making using autonomous agents, where decisions cascade through the system, influenced both by independent data inputs and the collective decision flow.

One notable sub-component of the embodiments described herein is a component that disaggregates part of the transacting data, e.g., name, address, Social Security number, date of birth, etc. The sub-component disaggregates the entity traits in the transacting party, disaggregates the entity traits in the watchlist entities, and then matching is performed.

For example, if a name of a person is associated with a transaction is Cuba Smith, and the country of Cuba is a sanctioned country, a prior art method would simply flag the transaction packet, and say this needs to be reviewed by four people. Humans and current matching systems are not capable of extracting from a packet with this information in transit over a network, and determine that the two are not associated.

In another example, a transaction involves a watchlist entity, a transacting party, and an address. The watchlist entity (e.g., the entity of concern) is, for example, named JIMMY CRIMINAL, and the transacting party, e.g., Helen Goody Two-Shoes, resides in Tijuana, Mexico where there happens to be a street named Jimmy Criminal Ave. Conventional methods might flag this transaction as a potential risk because the street name and the watchlist name are the same. However, the embodiments described herein would disaggregate the relevant data and correctly identify the situation as a false positive, determining that no further review is necessary. The reason is that the transacting party's name (i.e., Helen Goody Two-Shoes) is not Jimmy Criminal, but rather the transacting party's name appears only in association with the street address including the term Jimmy Criminal, reducing the risk of confusion and unnecessary scrutiny.

In some embodiments, example transactions may include ACH transactions, wire transfers (including international wires), and real-time payments. The one or more agentic systems are capable of identifying the type of transaction being processed and dynamically disaggregates the transaction data based on its specific type. For instance, the system can differentiate between ACH, wire transfers, and real-time payments and apply the appropriate rules and processing steps tailored to the particular transaction type. This ensures that each transaction is handled with the specific protocols and regulatory requirements pertinent to its category.

The embodiments described herein significantly reduce false positives and adapt to various types of financial transactions, offering a more accurate and efficient approach to transaction analysis for compliance and monitoring purposes.

Figure 4:
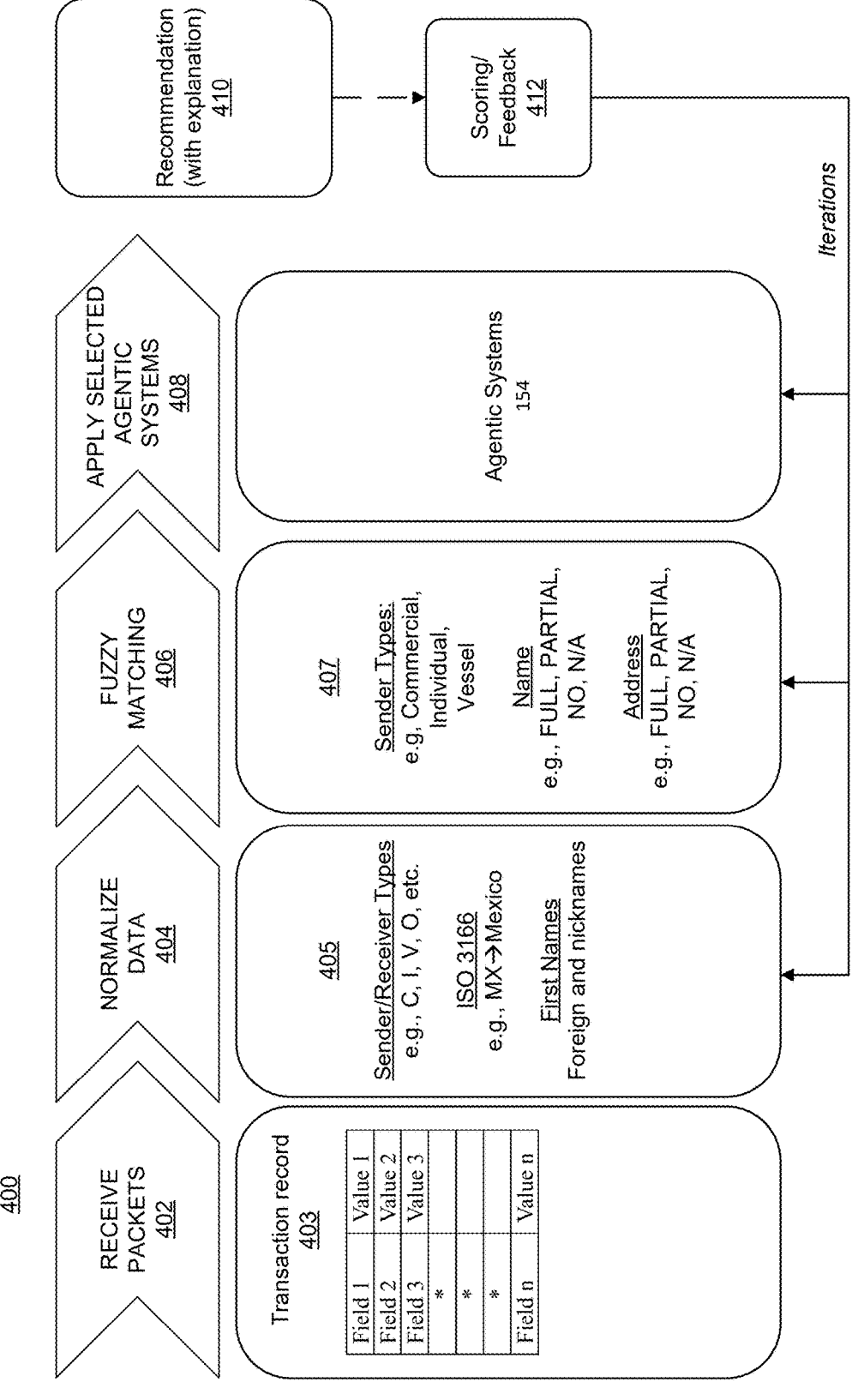
FIG. 4 illustrates an explainable rules-based agentic system 400 according to an example implementation.

FIG. 4 illustrates an explainable rules-based agentic system 400 according to an example implementation. Similar to the process described above in connection with FIG. 3, the explainable rules-based agentic system 400 evaluates a transaction record 403 containing field-value pairs and generates an access control recommendation. The recommendation may include an explanation for the recommendation. The process begins with a receive packets operation 402, where the system receives packets containing a transaction record 403. The record is processed through an extract and normalize operation 404 to ensure the data is in a consistent format for further analysis. In some embodiments, the types of the entities that are a party to the transaction (e.g., sender/receiver types) are identified.

In an example implementation, a standardized code system is employed to facilitate the extraction of transaction data. For example, ISO 3166, a standard published by the International Organization for Standardization (ISO), can be utilized. This standard delineates codes for the names of countries, dependent territories, and special areas of geographical interest, offering a reliable framework for representing geographic entities. ISO 3166 provides a set of short, consistent codes that simplify the identification of countries and their subdivisions, ensuring uniformity in data representation across various systems and applications.

In addition to the ISO 3166 standard, the extract and normalize operation 404 can encompass further normalization processes. These processes may include name normalization, which standardizes the presentation of names; pattern recognition techniques to identify variations in names; and advanced methods from machine learning (ML) and natural language processing (NLP) to analyze and interpret the data effectively. Contextual analysis also plays a vital role in understanding how names and codes are used within specific contexts, while rule-based systems can provide structured approaches to data handling. Together, these methodologies enhance the accuracy and consistency of the data extraction process, enabling more effective transaction analysis and compliance monitoring.

Following this, a fuzzy matching operation 406 is applied, allowing the system to extract and compare key elements of the transaction record against predefined data sets, accommodating imperfect or incomplete information. Fuzzy matching is an advanced data comparison technique utilized to ascertain the types of senders and receivers in transaction data. This technique is particularly valuable in scenarios where the information may not be perfectly aligned or may contain variations. The categorization of sender and receiver types is essential for effective transaction monitoring and compliance verification.

For sender types, classifications can include, for example, Commercial, Individual, and Vessel. Fuzzy matching assesses various attributes associated with the sender, including their name and address. For names, the matching process can categorize entries as, for example, FULL (exact match), PARTIAL (a close but not exact match), NO (no match), or N/A (not applicable). Similarly, for addresses, the same categories apply, enabling a comprehensive evaluation of the sender's details.

The same classification method applies to receiver types, which can also fall into, for example, Commercial, Individual, or Vessel categories. The fuzzy matching process again analyzes the receiver's name and address, applying the same predefined criteria of, for example, FULL, PARTIAL, NO, and N/A. By leveraging fuzzy matching algorithms, the system can effectively handle discrepancies in data entries, such as variations in spelling, formatting, or abbreviations, thereby enhancing the accuracy of identifying sender and receiver types in transactions. This sophisticated analysis is crucial for ensuring compliance with regulatory standards and mitigating potential risks associated with financial transactions.

Next, an agentic system selection operation 408 determines which specific agentic system (e.g., agentic system 154-1, agentic system 154-2, etc., collectively shown as agentic systems 154) should handle particular {field, value} pairs within the transaction record 403. The selection is based on predefined criteria such as the nature of the data fields (e.g., personal identifiers, transaction amounts), security risks associated with the values, and relevant regulatory or compliance considerations. Once the appropriate agentic system is selected, it processes the data through a processing and recommendation operation 410. This operation leverages the agentic system's specialized capabilities—such as rule-based analysis, machine learning models, or natural language processing—to evaluate the data and generate an access recommendation or flag for further review.

Finally, a scoring and feedback operation 412 scores and provides an explanation. In some implementations, the process is iterative.

Figure 5:
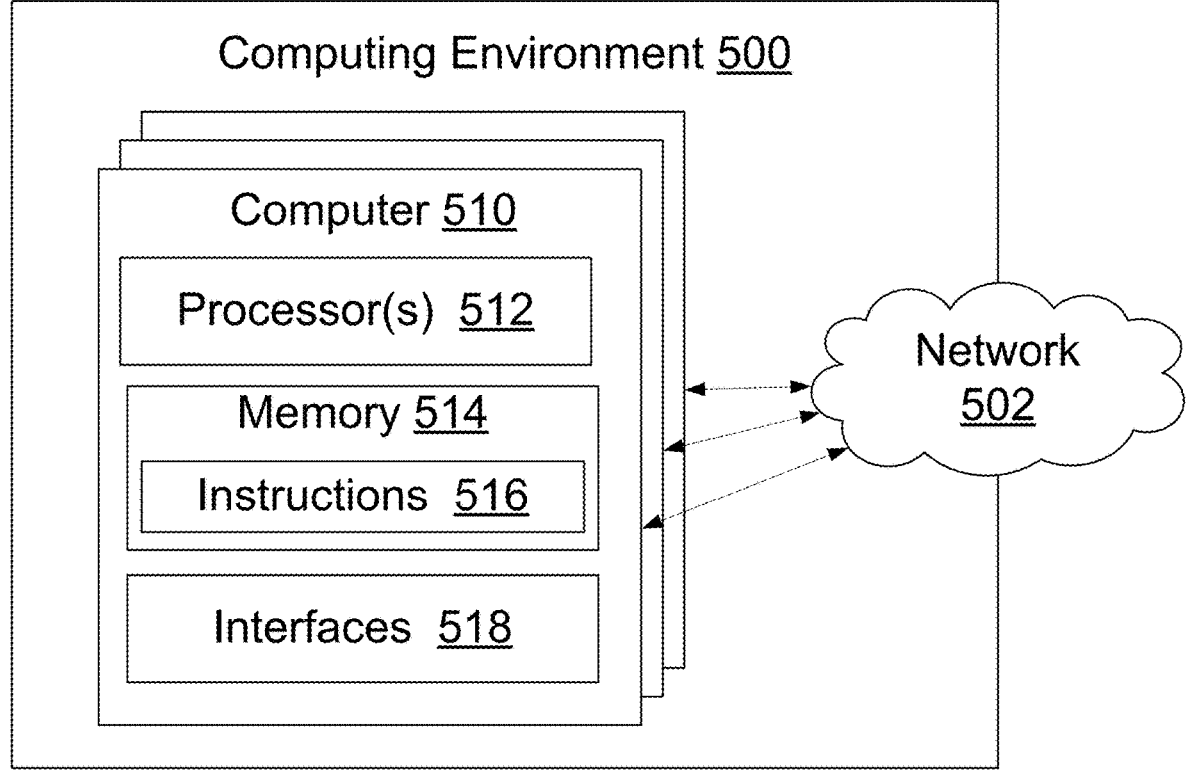
FIG. 5 discloses a computing environment with which aspects of the present disclosure may be implemented.

FIG. 5 discloses a computing environment 500 in which aspects of the present disclosure may be implemented. A computing environment 500 is a set of one or more virtual or physical computers 510 that individually or in cooperation achieve tasks, such as implementing one or more aspects described herein. The computers 510 have components that cooperate to cause output based on input. Example computers 510 include desktops, servers, mobile devices (e.g., smart phones and laptops), wearables, virtual reality devices, augmented reality devices, expanded reality devices, spatial computing devices, virtualized devices, other computers, or combinations thereof. In particular example implementations, the computing environment 500 includes at least one physical computer.

The computing environment 500 may specifically be used to implement one or more aspects described herein. In some examples, one or more of the computers 510 may be implemented as a user device, such as mobile device and others of the computers 510 may be used to implement aspects of a machine learning framework useable to train and deploy models exposed to the mobile device or provide other functionality, such as through exposed application programming interfaces.

The computing environment 500 can be arranged in any of a variety of ways. The computers 510 can be local to or remote from other computers 510 of the environment 500. The computing environment 500 can include computers 510 arranged according to client-server models, peer-to-peer models, edge computing models, other models, or combinations thereof.

In many examples, the computers 510 are communicatively coupled with devices internal or external to the computing environment 500 via a network 502. The network 502 is a set of devices that facilitate communication from a sender to a destination, such as by implementing communication protocols. Example networks 502 include local area networks, wide area networks, intranets, or the Internet.

In some implementations, computers 510 can be general-purpose computing devices (e.g., consumer computing devices). In some instances, via hardware or software configuration, computers 510 can be special purpose computing devices, such as servers able to practically handle large amounts of client traffic, machine learning devices able to practically train machine learning models, data stores able to practically store and respond to requests for large amounts of data, other special purposes computers, or combinations thereof.

thereof. The relative differences in capabilities of different kinds of computing devices can result in certain devices specializing in certain tasks. For instance, a machine learning model may be trained on a powerful computing device and then stored on a relatively lower powered device for use.

Many example computers 510 include one or more processors 512, memory 514, and one or more interfaces 518. Such components can be virtual, physical, or combinations thereof.

The one or more processors 512 are components that execute instructions, such as instructions that obtain data, process the data, and provide output based on the processing. The one or more processors 512 often obtain instructions and data stored in the memory 514. The one or more processors 512 can take any of a variety of forms, such as central processing units, graphics processing units, coprocessors, tensor processing units, artificial intelligence accelerators, microcontrollers, microprocessors, application-specific integrated circuits, field programmable gate arrays, other processors, or combinations thereof. In example implementations, the one or more processors 512 include at least one physical processor implemented as an electrical circuit. Example providers of processors 512 include INTEL, AMD, QUALCOMM, TEXAS INSTRUMENTS, and APPLE.

The memory 514 is a collection of components configured to store instructions 516 and data for later retrieval and use. The instructions 516 can, when executed by the one or more processors 512, cause execution of one or more operations that implement aspects described herein. In many examples, the memory 514 is a non-transitory computer readable medium, such as random-access memory, read only memory, cache memory, registers, portable memory (e.g., enclosed drives or optical disks), mass storage devices, hard drives, solid state drives, other kinds of memory, or combinations thereof. In certain circumstances, transitory memory 514 can store information encoded in transient signals.

The one or more interfaces 518 are components that facilitate receiving input from and providing output to something external to the computer 510, such as visual output components (e.g., displays or lights), audio output components (e.g., speakers), haptic output components (e.g., vibratory components), visual input components (e.g., cameras), auditory input components (e.g., microphones), haptic input components (e.g., touch or vibration sensitive components), motion input components (e.g., mice, gesture controllers, finger trackers, eye trackers, or movement sensors), buttons (e.g., keyboards or mouse buttons), position sensors (e.g., terrestrial or satellite-based position sensors such as those using the Global Positioning System), other input components, or combinations thereof (e.g., a touch sensitive display). The one or more interfaces 518 can include components for sending or receiving data from other computing environments or electronic devices, such as one or more wired connections (e.g., Universal Serial Bus connections, THUNDERBOLT connections, ETHERNET connections, serial ports, or parallel ports) or wireless connections (e.g., via components configured to communicate via radiofrequency signals, such as according to WI-FI, cellular, BLUETOOTH, ZIGBEE, or other protocols). One or more of the one or more interfaces 518 can facilitate connection of the computing environment 500 to a network 590.

The computers 510 can include any of a variety of other components to facilitate performance of operations described herein. Example components include one or more power units (e.g., batteries, capacitors, power harvesters, or power supplies) that provide operational power, one or more busses to provide intra-device communication, one or more cases or housings to encase one or more components, other components, or combinations thereof.

A person of skill in the art, having benefit of this disclosure, may recognize various ways for implementing technology described herein, such as by using any of a variety of programming languages (e.g., a C-family programming language, PYTHON, JAVA, RUST, HASKELL, other languages, or combinations thereof), libraries or packages (e.g., that provide functions for obtaining, processing, and presenting data, such as may be obtained using a package manager like PIP or CONDA), compilers, and interpreters to implement aspects described herein. Example libraries include NLTK (Natural Language Toolkit) by Team NLTK (providing natural language functionality), PYTORCH by META (providing machine learning functionality), NUMPY by the NUMPY Developers (providing mathematical functions), and BOOST by the Boost Community (providing various data structures and functions) among others. Operating systems (e.g., WINDOWS, LINUX, MACOS, IOS, and ANDROID) may provide their own libraries or application programming interfaces useful for implementing aspects described herein, including user interfaces and interacting with hardware or software components. Web applications can also be used, such as those implemented using JAVASCRIPT or another language. A person of skill in the art, with the benefit of the disclosure herein, can use programming tools to assist in the creation of software or hardware to achieve techniques described herein, such as intelligent code completion tools (e.g., INTELLISENSE) and artificial intelligence tools (e.g., GITHUB COPILOT by MICROSOFT or CODE LLAMA by META).

In some examples, large language models can be used to understand natural language, generate natural language, or perform other tasks. Examples of such large language models include CHATGPT by OPENAI, a LLAMA model by META, a CLAUDE model by ANTHROPIC, others, or combinations thereof. Such models can be fine-tuned on relevant data using any of a variety of techniques to improve the accuracy and usefulness of the answers. The models can be run locally on server or client devices or accessed via an application programming interface. Some of those models or services provided by entities responsible for the models may include other features, such as speech-to-text features, text-to-speech, image analysis, research features, and other features, which may also be used as applicable.

Techniques herein may be applicable to improving technological processes of a financial institution, such as technological aspects of transactions (e.g., resisting fraud, entering loan agreements, transferring financial instruments, or facilitating payments). In certain embodiments, aspects of the described solutions are offered as a utility designed to enhance operational effectiveness by providing recommendations to support the manual adjudication process of existing alert-generating systems. These systems identify transactions associated with sanctioned entities, generating alerts, commonly referred to as "hits" or "flags". The utility facilitates the review of these alerts, which can be assessed by one or more adjudicators who evaluate the utility's recommendations and determine whether to accept or reject them.

Following the review by the adjudicators (e.g., advisory system(s) 156, which may be arbitrators), a transaction may either be classified as a false positive or escalated to an enterprise financial crimes compliance (EFCC) system for further action. This utility operates based on a set of internally developed deterministic rules and APIs that interface with other systems. Its output is generated from the input received from these systems, which notify the transaction server that may match entities on watchlists. In addition to providing a recommendation for either passing or reviewing a transaction, the utility also delivers a rationale (including explanations and comments) and a reason code associated with its recommendation. Although technology may be related to processes performed by a financial institution, unless otherwise explicitly stated, claimed inventions are not directed to fundamental economic principles, fundamental economic practices, commercial interactions, legal interactions, or other patent-ineligible subject matter without something significantly more.

Where implementations involve personal or corporate data, that data can be stored in a manner consistent with relevant laws and with a defined privacy policy. In certain circumstances, the data can be decentralized, anonymized, or fuzzed to reduce the amount of accurate private data that is stored or accessible at a particular computer. The data can be stored in accordance with a classification system that reflects the level of sensitivity of the data and that encourages human or computer handlers to treat the data with a commensurate level of care.

Where implementations involve machine learning, machine learning can be used according to a defined machine learning policy. The policy can encourage training of a machine learning model with a diverse set of training data. Further, the policy can encourage testing for and correcting undesirable bias embodied in the machine learning model. The machine learning model can further be aligned such that it tends to produce output consistent with a predetermined morality. Where machine learning models are used in relation to a process that makes decisions affecting individuals, the machine learning model can be configured to be explainable such that the reasons behind the decision can be known or determinable. The machine learning model can be trained or configured to avoid making decisions based on protected characteristics.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method for improving transaction screening accuracy, comprising:

using machine learning systems trained on historical transaction data to perform screening operations by:

dynamically adjusting screening thresholds and predefined criteria based on past outcomes, thereby generating adjusted screening thresholds and adjusted predefined criteria;

executing cascading decision trees to evaluate the adjusted predefined criteria and decision-making steps using a hierarchical rules engine established by:

defining the cascading decision tree nodes with the adjusted predefined criteria, incorporating artificial intelligence models at each decision node, and setting threshold values and weighting factors for transaction analysis; and generating evaluation outputs comprising:

detection accuracy metrics for each decision node;

identified patterns in false positive triggers; and recommended threshold adjustments.

2. The method of claim 1, further comprising:

providing explanations for screening decisions to aid manual reviewers by:

generating rationales for recommendations based on specific screening criteria and threshold violations, recording reason codes that map to identified risk patterns and compliance rules, and storing the specific criteria and data elements that triggered each screening decision in a training database.

3. The method of claim 1, further comprising:

automatically applying the recommended threshold adjustments to optimize future screening decisions while maintaining audit trails for regulatory compliance.

4. The method of claim 1, further comprising:

disaggregating traits in transacting parties and watchlist entities; and performing matching using at least one analytical tool.

5. The method of claim 1, wherein the dynamically adjusting screening thresholds and predefined criteria comprises:

calculating optimal threshold levels using statistical analysis of historical transaction outcomes;

automatically tuning detection parameters based on false positive rates and processing efficiency metrics; and implementing predictive models to adjust threshold values according to emerging risk patterns and transaction volumes.

6. The method of claim 1, wherein using machine learning systems trained on historical transaction data comprises:

utilizing supervised learning techniques with labeled datasets;

incorporating reinforcement learning mechanisms that adjust model parameters based on feedback from advisory system reviews; and periodically retraining the machine learning systems using updated datasets.

7. The method of claim 1, further comprising integrating feedback loops to enhance future screening recommendations and reduce false positives over time.

8. The method of claim 1, further comprising:

analyzing feedback patterns across multiple time horizons and tracking key metrics including false positive rates and processing times; and maintaining performance histories for each of the machine learning systems by tracking detection accuracy and false positive rates.

9. The method of claim 1, further comprising implementing natural language processing models for entity name matching and utilizing anomaly detection models for identifying suspicious patterns.

10. The method of claim 1, further comprising analyzing both explicit feedback from advisory subsystems and implicit feedback from transaction patterns.

11. The method of claim 2, further comprising automatically updating the screening thresholds and predefined criteria based on real-time sanction list data feed updates and pattern detection algorithms.

12. The method of claim 3, further comprising implementing a temporal analysis framework and evaluating threshold and predefined criteria effectiveness across different time periods.

13. The method of claim 1, further comprising:

establishing the hierarchical rules engine by:

processing different transaction types including Automated Clearing House (ACH), wire transfers, and real-time payments using corresponding type-specific screening protocols.

14. The method of claim 1, further comprising maintaining audit trails for regulatory compliance and generating compliance reports based on the screening decisions and explanations.

15. The method of claim 2, further comprising:

defining the cascading decision tree nodes further comprises establishing priority-based evaluation sequences that process indicators exceeding predetermined risk thresholds before general screening criteria.

16. The method of claim 5, wherein implementing the predictive models comprises deploying ensemble learning techniques that combine multiple prediction algorithms for threshold optimization.

17. The method of claim 4, wherein performing the matching comprises applying fuzzy matching algorithms that accommodate variations in entity names and addresses.

18. The method of claim 1, wherein the training database stores performance correlation data linking specific screening criteria combinations to historical accuracy outcomes.

19. The method of claim 2, wherein the evaluation outputs further comprise confidence scores for each recommendation and processing time metrics for processing time optimization.

20. The method of claim 1, further comprising:

receiving transaction data packets from multiple transaction types including Automated Clearing House (ACH), wire transfers, and real-time payments;

parsing packet headers and payloads to identify entity traits, transaction attributes, and contextual indicators; and applying pattern recognition techniques to identify variations in entity identifiers across different formats and languages using the artificial intelligence models.

* * * * *